Patented Dec. 23, 1941

2,267,639

UNITED STATES PATENT OFFICE 2,267,639

MANUFACTURE OF COLORING MATTERS

James Holden Clayton, Whisterfield, Siddington, and Bernard Bann, Stockport, England, assignors to The Manchester Oxide Company Limited, Manchester, England, a British company No Drawing. Application March 28, 1939, Serial No. 264,635. In Great Britain April 30, 1938

5 Claims. (Cl. 260—178)

The present invention relates to improvements in the manufacture of colouring matters and more especially to the manufacture of 3:3'-dimethyldiphenyldisulphide-4:4'-bis (azo-β-naphthol) which has been found by us to be a valuable red pigment.

Dyestuffs and pigments, including bis-azo compounds containing the —S—S— group are known. The methods hitherto proposed for making such compounds are, in most cases, rather complex; since they involve the direct reaction of aromatic amines with sulphur and in such direct action it is difficult to control the amount of sulphur taken up and the reaction gives rise to monosulphides, trisulphides and even higher sulphides, as well as or instead of the desired disulphide. The present invention provides a simple method which enables the above-named bis-azo disulphide pigment to be obtained by a process which is not expensive.

It is known that organic compounds, including dyestuffs, which contain a thiocyano group can be converted into disulphides by treatment with caustic alkali or alkali sulphide. It has now been found that the above-named bis-azo disulphide pigment can be conveniently prepared by taking advantage of this known reaction at one stage of the general process of diazotising 5-thiocyano-2-aminotoluene and coupling with β-naphthol in the form of an alkali β-naphtholate solution. Thus, the final azo compound may be treated with caustic alkali or alkali sulphide or polysulphide with or without oxidation, or an intermediate may be treated.

Thus, according to another feature of the invention 5-thiocyano-2-aminotoluene is converted into a corresponding diamino disulphide by treatment with caustic alkali or alkali sulphide or polysulphide, with or without oxidation, and the resulting diamino disulphide is tetrazotized and coupled (in one or two stages), with β-naphthol. Or, less advantageously, the diazonium salt may be converted by alkali into the diazotate, or isodiazotate of the disulphide tetrazonium salt, which can be converted by acid into the normal tetrazonium salt and coupled with β-naphthol.

The resulting compound fulfils to a satisfactory extent the exacting requirements of a good pigment.

EXAMPLE 1

Stage 1

Coupling of 5:thiocyano-2-aminotoluene with β-naphthol

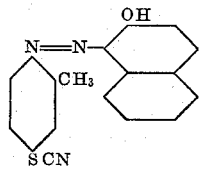

5 - thiocyano - 2 - aminotoluene (8.2 parts) is dissolved in hot water (50 parts) and hydrochloric acid (15 parts). The solution is poured on to ice and diazotised with sodium nitrite (7 parts). Sodium acetate (6 parts) is added.

A solution of β-naphthol (7.3 parts) in water containing caustic soda (2.2 parts) and sodium carbonate (2.65 parts) is prepared. The two solutions were run at equal rates into the same vessel and the orange pigment which separates is washed by decantation and filtered to a paste containing approximately 20% dry color.

Stage 2

Conversion to 3:3'-dimethyldiphenyldisulphide 4:4'-bis-(azo-β-naphthol)

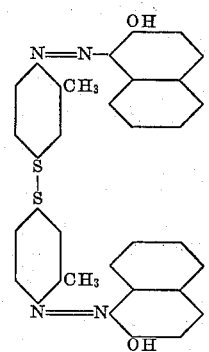

The above paste is boiled for one hour with caustic soda (8 parts) in water (500 parts). The colour slowly changes from orange to red. The pigment is washed several times by decantation, filtered and dried.

EXAMPLE 2

STAGE 1

*4:4'-diamino-3:3'-dimethyldiphenyldisulphide*

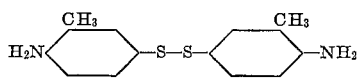

This compound is obtained from 5-thiocyano-2-aminotoluene by treatment with alkalis.

Aqueous or alcoholic sodium disulphide may be used, but the preferred method is one in which aqueous caustic soda is used as reagent. The compound is obtained in a pure state, M. P. 113°, and in good yield and is identical with that obtained by Hodgson. (J. C. S. 1912, *101*, 1693).

AQUEOUS CAUSTIC SODA METHOD 98 parts by weight caustic soda are dissolved in 700 parts of water and stirred vigorously at 100° C. 328 parts thiocyano-ortho-toluidine are added, forming an oily suspension which soon becomes opaque due to fine emulsification.

A steady reaction ensues with rise of temperature; after 10 minutes a heavy layer of oil separates, leaving clear aqueous liquid above. Rapid agitation and continued heating at 100°–105° C. keeps this oil in globular form and after 15 minutes the oily drops solidify to a yellow granular solid.

After 20 minutes reaction is complete and the product is washed by decantation with cold water.

STAGE 2

*Tetrazotisation of 4:4'-diamino-3:3'-dimethyl-diphenyldisulphide*

69 parts of the free base ground to a fine powder are triturated with 150 parts hydrochloric acid (6 mols.) in order to obtain a fine cream-like dispersion. Water is then gradually added and the finely-divided suspension of the hydrochloride of the base is tetrazotised at 5° C. The reaction is completed in the usual manner after about 20 minutes agitation.

The diazonium solution is filtered and neutralised by adding the calculated amount of sodium acetate required by the 2 mols excess of hydrochloric acid employed (68 parts).

The reaction mixture is then neutral to Congo red paper. The solution is then diluted to a volume of 5,000 parts (Solution A).

STAGE 3

*Coupling of the tetrazotised disulphide with β-naphthol*

A neutral coupling is preferred.

The β-naphthol solution (Solution B) is made up as follows:

72 parts β-naphthol are dissolved in
220 parts of 10% caustic soda solution and
265 parts of 10% sodium carbonate solution added.

This carbonate is sufficient to neutralise the acetic acid liberated during coupling from the sodium acetate used in solution A.

Turkey red oil has a beneficial effect on the coupling.

The β-naphthol solution is diluted to a total volume of 5,000 parts.

COUPLING PROCEDURE 3,000 parts of water together with suitable dispersing agent such as Turkey red oil is rapidly agitated at 20° C. Solutions A and B are then added simultaneously and at equal speeds so that at no time is either component in excess.

The reaction is instantaneous, a brilliant red pigment being precipitated.

The finally-obtained reaction product is neutral in reaction and contains neither free naphthol nor any diazonium salt.

The suspension of pigment is diluted to 5,000 parts with cold water and allowed to stand, when the colour is soon deposited. The pigment is washed, by repeated decantation until free from mineral salts, then filter-pressed and washed with water.

Finally, the cake is dried in the steam oven and powdered.

We declare that what we claim is:

1. The process of preparing a pigment comprising 3:3' - dimethyldiphenyldisulphide-4:4' - bis - (azo - β-naphthol) substantially free of mono-, tri- and poly-sulphides, which consists of effecting diazotization of 5-thiocyano-2-aminotoluene, coupling with β-naphthol, and treating a product thereof in thiocyano form with alkali solution.

2. The process of preparing a pigment comprising 3:3' - dimethyldiphenyldisulphide-4:4' - bis-(azo-β-naphthol), which includes the step of treating 2 - methyl-4-thiocyano-phenyl-(azo-β-naphthol) in an alkaline medium to bring about formation of the disulphide pigment.

3. The process of preparing a pigment comprising 3:3' - dimethyldiphenyldisulphide -4:4'-bis-(azo-β-naphthol) substantially free of mono-, tri- and poly-sulphides, which consists of heating 2-methyl-4-thiocyanophenyl-(azo-β-naphthol) with an alkali solution to bring about formation of the disulphide pigment, separating the liquor from the pasty solid mass of disulphide pigment, and drying the said pasty solid mass.

4. The process of preparing a pigment comprising 3:3' - dimethyldiphenyldisulphide-4:4' - bis-(azo-β-naphthol) substantially free of mono-, tri- and poly-sulphides, which consists of heating 5-thiocyano-2-aminotoluene with an alkali solution to bring about formation of diamino disulphide compound, separating solid diamino disulphide compound, tetrazotizing the same in water dispersion, coupling with alkali β-naphtholate solution, and separating the solid disulphide pigment produced.

5. The process of converting 5-thiocyano-2-aminotoluene into a pigment comprising 3:3'-dimethyldiphenyldisulphide - 4:4' - bis - (azo - β - naphthol) substantially free of mono-, tri- and poly-sulphides, which includes the steps of diazotizing the amino groups, coupling the diazotized amino groups with β-naphthol, and heating the diazotized and coupled material with an alkali solution for combining two phenyl nuclei of the said original toluene derivative through direct coupling of the sulphur atoms of the original thiocyano group of such two nuclei.

JAMES H. CLAYTON.
BERNARD BANN.